(12) United States Patent
Brenner

(10) Patent No.: US 6,337,933 B1
(45) Date of Patent: Jan. 8, 2002

(54) NARROW BANDWIDTH FIBER BRAGG GRATING APPARATUS

(75) Inventor: Tomas Brenner, Severna Park, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/288,007

(22) Filed: Apr. 8, 1999

(51) Int. Cl.[7] .............................. G02B 6/26; H04J 14/02
(52) U.S. Cl. ............................. 385/15; 385/37; 385/24; 385/42; 359/130; 359/124; 359/127
(58) Field of Search ............................. 385/37, 24, 15, 385/42; 359/124, 127, 130

(56) References Cited

U.S. PATENT DOCUMENTS

| 5,793,508 A | * | 8/1998 | Meli | 359/130 |
| 5,825,520 A | * | 10/1998 | Huber | 359/130 |
| 5,982,518 A | * | 11/1999 | Mizrahi | 359/130 |

OTHER PUBLICATIONS

D. Taverner, et al., "Dispersion Compensation of 16ps Pulses Over 100 100km of Step–index Fibre Using Cascaded Chirped Fibre Gratings", Electronics Letters, vol. 31 No. 12, Jun. 1995.

* cited by examiner

Primary Examiner—Frank G. Font
Assistant Examiner—Roy M. Punnoose
(74) Attorney, Agent, or Firm—David L. Soltz; Daniel N. Daisak

(57) ABSTRACT

In accordance with the present invention, an optical device is provided which selects narrowly spaced optical channels used in dense wavelength division multiplexed systems. The device includes a first and second Bragg gratings in a cascaded configuration where each grating has a length which is shorter than a single grating configured to select a channel within a narrowly spaced channel plan. When taken together, the two Bragg gratings provide a narrow bandwidth wavelength selection device for narrowly spaced optical channels while avoiding manufacturing drawbacks associated with writing long gratings.

22 Claims, 4 Drawing Sheets

NARROW BANDWIDTH FIBER BRAGG GRATING APPARATUS

FIELD OF INVENTION

The present invention generally relates to optical communication systems and more particularly to an apparatus for selecting narrowly spaced optical channels in a dense wavelength division multiplexed transmission system.

BACKGROUND OF INVENTION

Wavelength division multiplexing (WDM) is a technique for increasing the capacity of existing fiber optic networks by transmitting a plurality of channels over a single waveguide medium. Dense WDM (DWDM) systems are also being employed where the channel spacings are more narrow than WDM systems, thereby providing increased signal traffic over the same waveguide. In these types of systems, it's essential to provide an optical device which selects a particular channel having a corresponding wavelength from a plurality of closely spaced channels associated with a multiplexed optical signal.

Channel selectivity can be performed by various techniques one of which is through the use of fiber Bragg gratings. A Bragg grating comprises a series of photoinduced refractive index perturbations in an optical fiber which reflects optical signals within a selected wavelength band and transmits wavelengths outside of the selected wavelength band. Essentially, a Bragg grating is a reflection filter because of the presence of what is known as a "stop band" which is the region where most of the incident light is reflected. The stop band is generally centered at the Bragg wavelength defined as $\lambda_{BRAGG}=2\tilde{n}\Lambda$, where $\tilde{n}$ is the modal index and $\Lambda$ is the grating period. Bragg gratings are described in more detail in Morey et al., *Photoinduced Bragg Gratings in Optical Fibers*, Optics & Photonics News, February 1994, pp. 9–14, and A. M. Vengsarkar et al., *Long-Period Fiber Gratings As Band-Rejection Filters*, Journal of Lightwave Technology, vol. 14, no. 1, January 1996, pp. 58–65, the disclosures of which are incorporated herein by reference.

For a typical Bragg grating, the refractive index varies over the fiber length. The periodic variation in refractive index can take the form of a series of "peaks" and "valleys", whereby the distance or period between two adjacent refractive index peaks defines, in part, the wavelength to be reflected by the Bragg grating. The bandwidth of a fiber Bragg grating is inversely proportional to its length. That is, the longer the grating, the more narrow the bandwidth to be reflected.

There are various methods for writing fiber Bragg gratings, the most common of which uses two interfering UV beams focused onto a fiber core. The light intensity modulation generated by the interfering UV beams alters the refractive index of the core material thereby generating a refractive index modulation pattern in the fiber. The resulting Bragg grating has a transmission minimum or stop-band at or near a desired wavelength where the incident light is reflected by the grating. When writing a Bragg grating, the refractive index distribution is responsible for the magnitude of sidebands in the spectral response. A truly apodized grating has Gaussian refractive index depth modulation with constant average refraction over its entire length. Such a grating virtually eliminates any sidebands. This is desirable when writing gratings for very narrowly spaced channels, for example in DWDM communication systems where crosstalk from closely spaced adjacent channels is at issue.

Although fiber Bragg gratings can be readily modeled using coupled mode equation theory, producing these gratings becomes more difficult with decreasing bandwidth, i.e. when selecting optical channels within a narrowly spaced channel plan. Relatively long gratings are difficult to produce mainly due to the stringent requirements for the homogeneity of the large diameter UV beams used to write the gratings and because of the sensitivity of the reflection spectrum caused by small aberrational effects from the associated optical components. In other words, the more narrow the bandwidth, the longer the grating and the more difficult it is to produce, especially in a mass production context.

Because of the need for wavelength selective components in WDM and DWDM systems with decreasing channel spacings, a narrow bandwidth filter device is needed to select particular optical channels within a closely spaced channel plan and to provide such a device which can be reliably reproduced for manufacturing purposes.

SUMMARY OF INVENTION

The present invention meets these needs and avoids the above-referenced drawbacks by providing an optical device which utilizes a first and second fiber Bragg grating which are shorter in length than a single longer grating otherwise used to select a narrowly spaced optical channel. The optical device in accordance with the present invention includes an optical transfer element having a first port for receiving a multiplexed optical signals having a plurality of channels, each of the channels at a respective wavelength. A first filtering element optically communicates with a second port of the transfer element. The first filtering element is configured to have a low transmissivity characteristic at or near at least one particular wavelength associated with a channel included in the plurality of multiplexed signals. The first filtering element receives the multiplexed signals and reflects a first portion of the multiplexed signals including the at least one channel toward the second port of the transfer element. A second filtering element optically communicates with the third port of the transfer element. The second filtering element is configured to have a low transmissivity characteristic at or near the at least one channel. The second filtering element receives the first portion of the multiplexed signal and reflects the at least one optical channel toward the third port of the transfer element and transmits a second portion of the multiplexed signal which includes optical channels near the at least one optical channel. The transfer element supplies the at least one optical channel to said fourth port.

The foregoing, and other features and advantages of the present invention will be apparent from the following description, the accompanying drawings and the appended claims.

DETAILED DESCRIPTION

In accordance with the present invention, an optical device is provided which selects narrowly spaced optical channels used in dense wavelength division multiplexed systems. The device includes a first and second Bragg gratings in a cascaded configuration where each grating has a length which is shorter than a single grating otherwise configured to select a channel within a narrowly spaced channel plan. When taken together, the two Bragg gratings provide a narrow bandwidth wavelength selection device for narrowly spaced optical channels while avoiding manufacturing drawbacks associated with forming long gratings.

Figure 1:
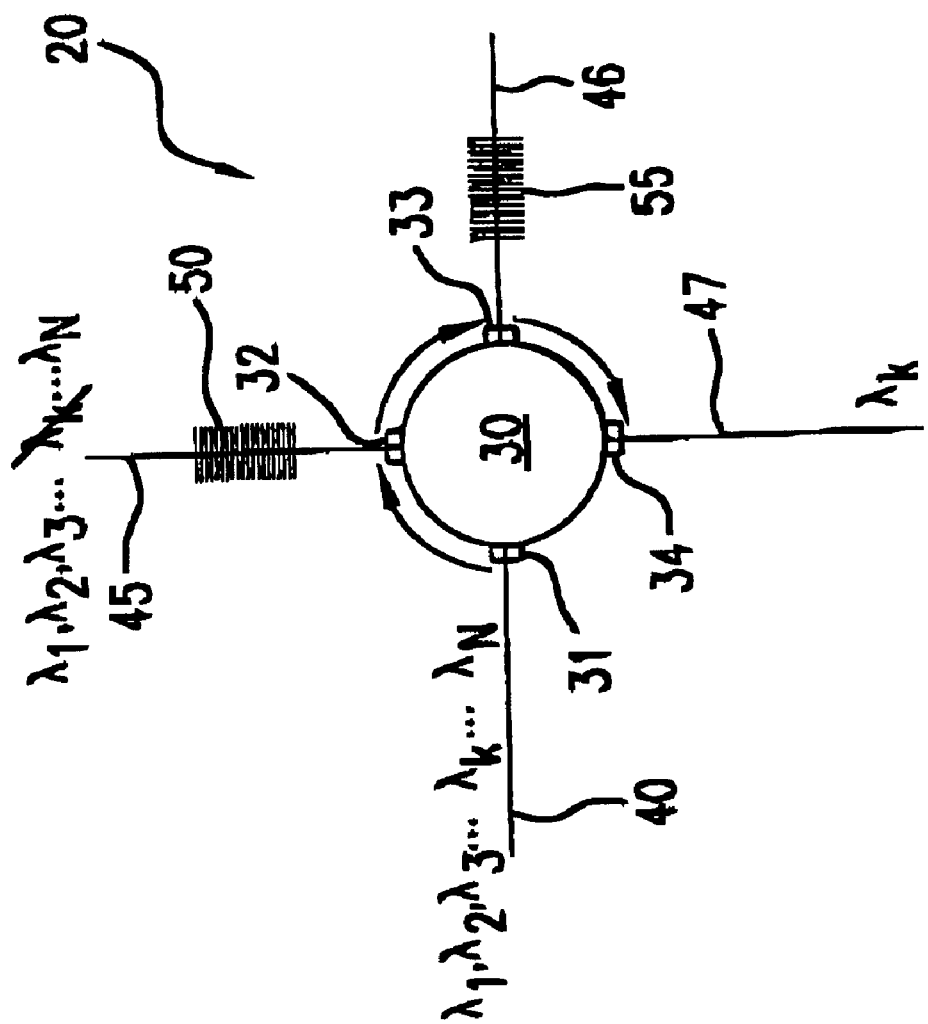
FIG. 1 is a schematic view of an optical device in accordance with the present invention.

Turning now to the drawings in which like reference characters indicate the same or similar elements, FIG. 1 illustrates an optical device 20 in accordance with the present invention. Optical circulator 30 includes first port 31, second port 32, third port 33, and fourth port 34. Optical transmission path 40 optically communicates with first port 31 of circulator 30 and carries wavelength division multiplexed optical signals having a plurality of channels, each at a respective wavelength, for example $\lambda_1 \ldots \lambda_N$. The expression "optically communicates" as used herein, refers to any optical connection, optical coupling, optical link or otherwise, by which optical signals carried by one optical system element are imparted to the "communicating" element. Such optically communicating devices are not necessarily directly connected to one another, but may be separated by intermediate optical components or devices. Optical transmission path 40 is typically a single-mode silica-based fiber with a low loss window in the 1550 nm range. However any optical waveguide which is capable of transporting multiple optical wavelengths can be employed as transmission path 40. The channels within the multiplexed optical signals can have spacing on the order of 25 GHz typically associated with dense wavelength division multiplexed communication systems.

First circulator port 31 receives the multiplexed optical signals which enter circulator 30 and directs them toward port 32. The signals exit circulator port 32 and are received by a first narrow Bragg grating positioned along optical path 45. Grating 50 is configured to reflect a first portion of the multiplexed optical signals including at least one of the plurality of optical channels. For example, grating 50 can be configured to reflect an optical channel having wavelength $\lambda_K$. In this example, the first portion of the signal including the optical channel having wavelength $\lambda_K$ is reflected back toward port 32, enters circulator 30, and propagates in a clockwise direction toward port 33. Another portion of the multiplexed signals, those channels having wavelengths other than $\lambda_K$ (i.e. wavelengths $\lambda_1 \ldots \lambda_J, \lambda_L \ldots \lambda_N$), pass-through grating 50 and exit through path 45. The reflected optical channel having wavelength $\lambda_K$ exits circulator 30 via port 33 onto transmission path 46.

A second narrow band fiber Bragg grating 55, is positioned along transmission path 46 and optically communicates with circulator port 33. Similar to first grating 50, grating 55 is configured to reflect the same optical channel as that reflected by grating 50, in this example the optical channel having wavelength $\lambda_K$, back toward port 33. In this preferred embodiment, both gratings 50 and 55 are narrow band gratings produced with substantially similar index of refraction distributions along their respective lengths while allowing for typical manufacturing variances. The lengths of each of these gratings can be approximately within the range of 3 to 3.5 cm corresponding to a 25 GHz channel spacing. Obviously, these values are exemplary and will vary with the particular channel spacings employed.

Those channels having wavelengths included in the first portion of the multiplexed signal which are outside of wavelength $\lambda_K$ pass-through grating 55. The reflected channel having wavelength $\lambda_K$ propagates clockwise within circulator 30 and exits at port 34 onto transmission path 47. Because a substantial portion of the multiplexed signals are transmitted by first grating 50, the optical signal received by second grating 55 essentially comprises the optical channel at or near wavelength $\lambda_K$. The second grating 55 is used to provide further filtering of the selected optical channel because of the relatively narrow channel spacings, e.g. 25 GHz, between channels within the multiplexed optical signals. In this manner, first and second Bragg gratings 50 and 55 are used to select a channel from a narrowly spaced channel plan rather than employing a single long grating which is difficult to reliably manufacture.

Figure 2:
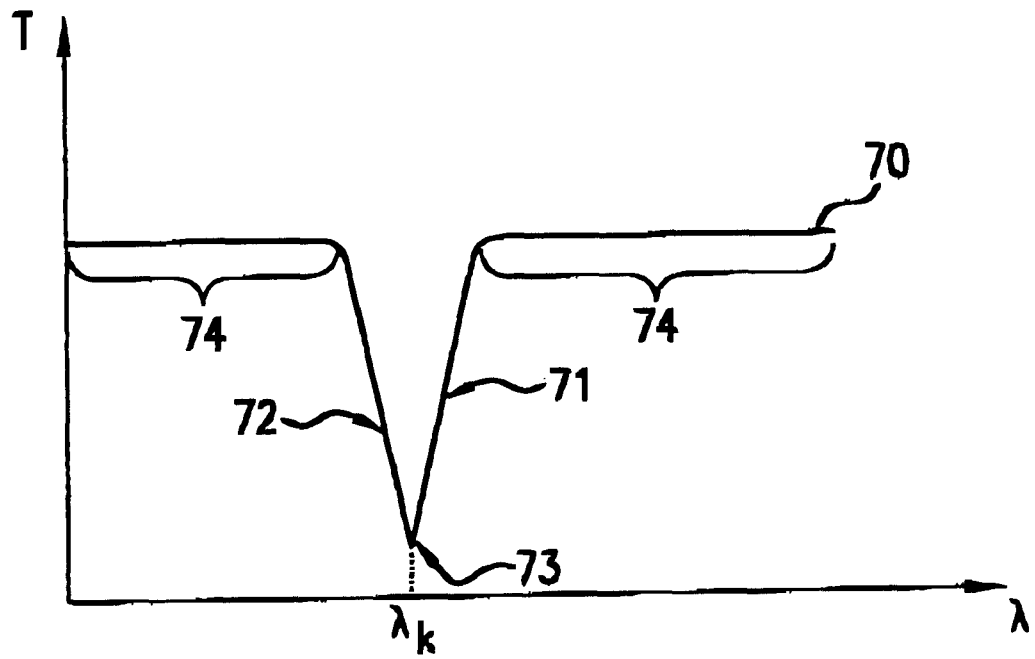
FIG. 2 illustrates a transmittance vs. wavelength spectrum associated with exemplary fiber Bragg gratings in accordance with the present invention.

FIG. 2 illustrates a transmittance vs. wavelength spectrum 70 associated with exemplary fiber Bragg gratings 50 and 55. As can be seen from curve 70, each grating is configured to reflect optical channels having wavelengths at or very close to $\lambda_K$. The effect of utilizing two similarly written gratings 50 and 55 in a cascaded configuration, as shown with reference to FIG. 1, is to produce a stop-band 73 with "steep" slopes 71 and 72. This provides an effective transition between stop-band 73 and transmission bands 74 of spectrum 70 needed to separate narrowly spaced optical channels.

Figure 3:
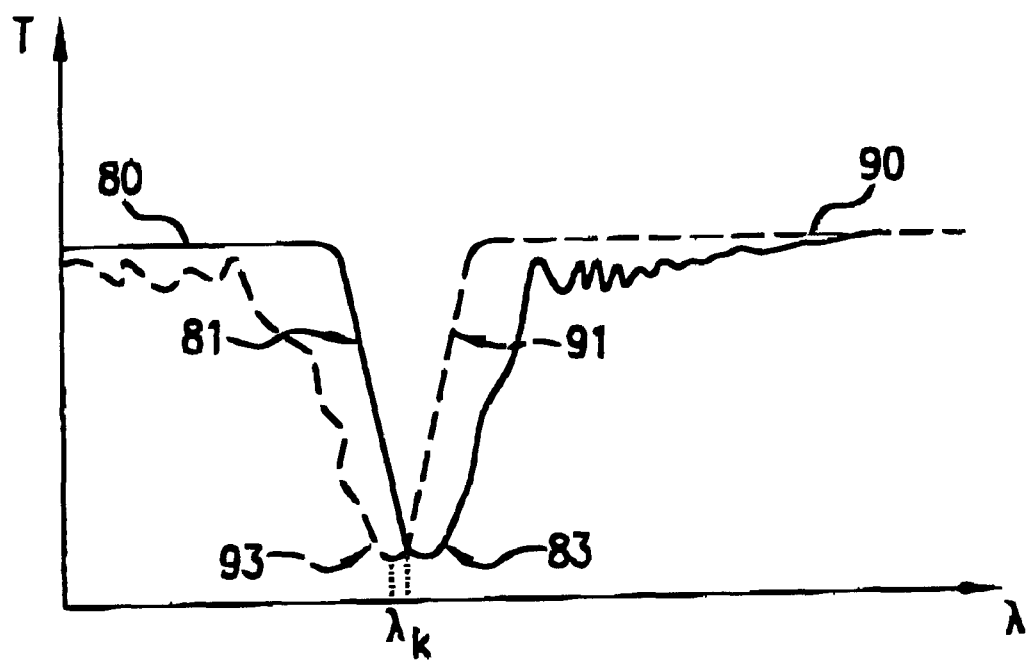
FIG. 3 illustrates a transmittance vs. wavelength spectrum associated with exemplary fiber Bragg gratings in accordance with the present invention.

Alternatively, gratings 50 and 55 may be substituted with fiber Bragg gratings having different transmission characteristics which, together, provide a narrow bandwidth selection filter for narrowly spaced optical channels. FIG. 3 illustrates transmittance vs. wavelength spectra 80 and 90 associated with the first and second cascaded gratings, respectively, similar to gratings 50 and 55 shown in FIG. 1. Transmission curve 80 has a sloped portion 81 and a stop-band portion 83 which includes at least one optical channel having wavelength $\lambda_K$. Similarly, transmission curve 90 has a sloped portion 91 and a stop-band portion 93 which includes at least the optical channel have wavelength $\lambda_K$. The first grating having transmission curve 80 receives the multiplexed optical signals via circulator port 32, the first grating is configured to transmit those channels having wavelengths less than $\lambda_K$ and reflect at least the optical channel having wavelength $\lambda_K$. The reflected wavelengths propagate to the second grating via circulator ports 32 and 33 as described above. The second grating having transmission curve 90 is configured to transmit optical channels greater than $\lambda_K$ and reflect at least the optical channel having wavelength $\lambda_K$ falling within stop-band 93. In this manner, the cascaded grating configuration having associated transmission curves 80 and 90 together effectively form a stop-band where a selected optical channel having wavelength $\lambda_K$ falls within this stop-band and is reflected by the gratings.

Although the length of these two gratings may be similar, their associated index of refraction distribution within the respective grating is dissimilar to accommodate the differing transmission profiles for each grating. In particular, when writing these gratings, having associated transmission curves 80 and 90, attention is focused on creating steep slopes 81 and 91 respectively between transmitted and reflected wavelengths. In this manner, two gratings having different reflection or transmission characteristics may be cascadedly coupled to optical circulator ports 32 and 33 to select a particular optical channel from narrowly spaced channels within a multiplexed optical signal.

It should be understood that the transmission characteristics of the first and second gratings may be interchanged. In other words, the first grating can be tuned to have a transmission characteristic similar to curve 90 and the second grating can be tuned to have a transmission characteristic similar to curve 80.

Figure 4:
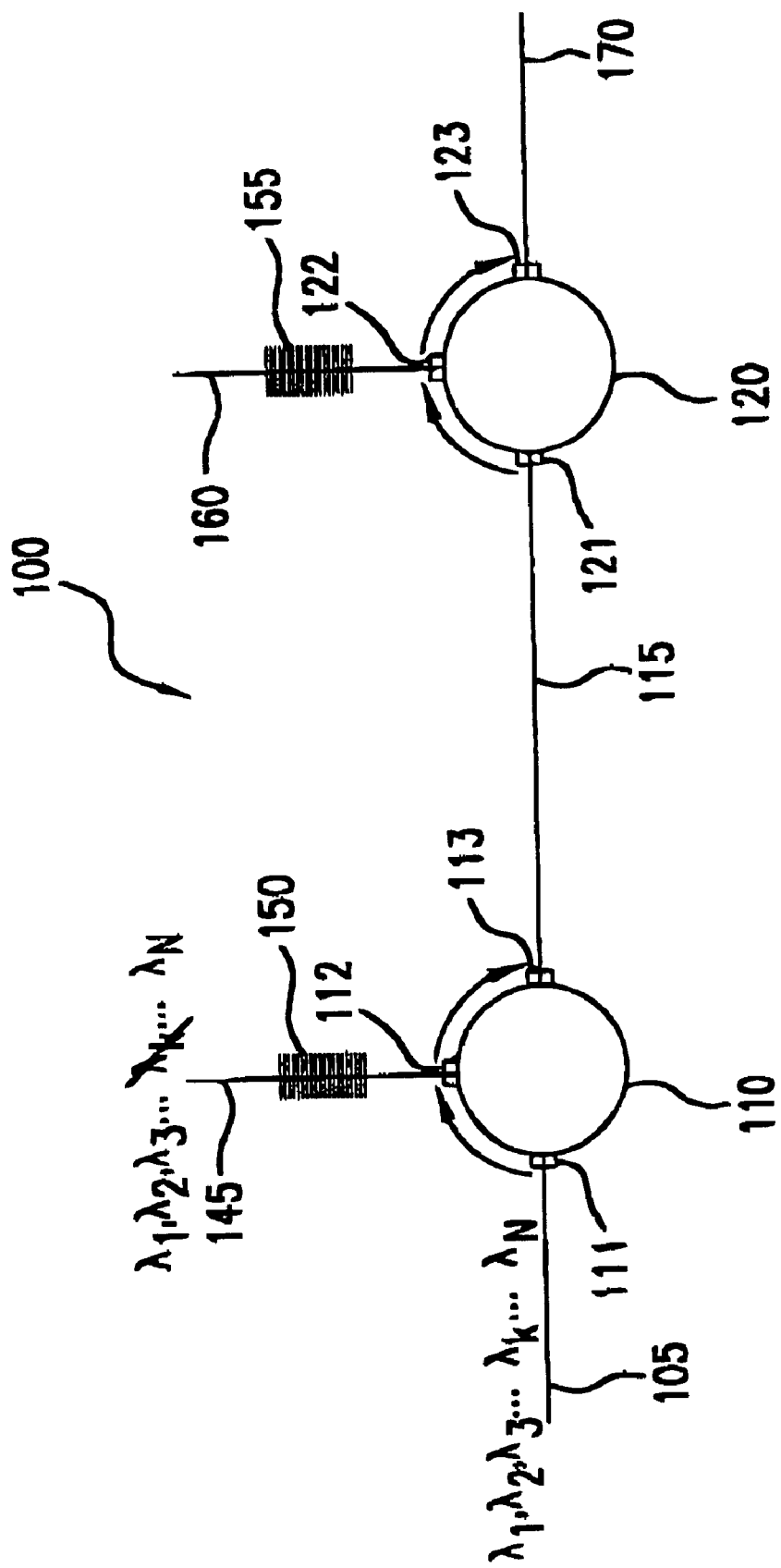
FIG. 4 is a schematic view of an alternative embodiment of an optical device in accordance with the present invention.

FIG. 4 illustrates an optical device 100 in accordance with an alternative embodiment of the present invention. A first optical circulator 110 includes first port 111, second port 112, and third port 113. Optical transmission path 105 carries wavelength division multiplexed optical signals having a plurality of channels, each at a respective wavelength, for example $\lambda_1 \ldots \lambda_N$. First circulator port 111 optically communicates with transmission path 105 and receives the multiplexed optical signals which enters circulator 110 and directs them, in a clockwise direction, toward port 112. The signals exit circulator port 112 and received by Bragg grating 150 positioned along optical path 145. Grating 150 can be configured to reflect The first portion of the multiplexed signals includes the particular optical channel at wavelength $\lambda_K$ as well as portions of the multiplexed signal near the selected channel. This is due to the inherent slope of the stop-band of the transmission curve associated with grating 150, similar to slopes 71 and 72 of the stop-band shown in FIG. 3. In this embodiment, grating 150 has an associated reflection characteristic similar to that described above with reference to FIG. 3. Grating 150 can be written within transmission path 145 with an exemplary length of approximately 3 to 3.5 cm corresponding to a 25 GHz channel spacing requirement. The first portion of the signal is reflected by grating 150 back toward port 112 and enters circulator 110. The reflected signal propagates in a clockwise direction and exits circulator 110 via port 113. A second portion of the multiplexed signals including channels not reflected by grating 150 are transmitted through the grating via transmission path 145.

A second circulator 120 optically communicates with first circulator 110. First port 121 of second circulator 120 optically communicates with port 113 of circulator 110 via transmission path 115. The first portion of the multiplexed signal including the optical channel having wavelength $\lambda_K$ supplied by port 13 of circulator 110 enters second circulator 120 via port 121 and propagates, in a clockwise direction, toward port 122. A second Bragg grating 155, disposed along transmission path 160, receives the first portion of the multiplexed signal reflected by first grating 150 via a port 122 of circulator 120. Grating 155 is configured to route a portion of the received signal having wavelength $\lambda_K$ back toward port 122. The signal having wavelength $\lambda_K$ propagates clockwise within circulator 120 and exits at port 123 onto transmission path 170. In this manner, the selected optical channel having wavelength $\lambda_K$ essentially undergoes a first selection by grating 150 and further selection or "filtering" by grating 155. Alternatively, first and second gratings 150 and 155 can be configured to have different transmission characteristics which together provide a narrow band selection filter such that the desired channel wavelength, e.g. $\lambda_K$, is selected in a similar manner as that described with reference to FIG. 3. In particular, first grating 150, may be configured to reflect at least an optical channel having wavelength $\lambda_K$ and transmit optical channels having wavelengths less than $\lambda_K$ similar to curve 80 in FIG. 3. The wavelengths reflected by the first grating 150 are supplied to grating 155 via ports 112 and 113 of circulator 110, transmission path 115 and first and second ports 121, 122 of second circulator 120. Second grating 155 has an associated transmission characteristic 90 similar to that described in FIG. 3 and is configured to reflect at least optical channel having wavelength $\lambda_K$ and transmit optical channels having wavelengths greater than $\lambda_K$. In this manner, exemplary transmission curves 80 and 90 in FIG. 3 can be associated with gratings 150 and 155, respectfully, effectively forming a stop band which includes wavelength $\lambda_K$ for the grating configuration. Again, it should be understood that the transmission characteristics of the first and second gratings may be interchanged. In other words, the first grating can be tuned to have a transmission characteristic similar to curve 90 and the second grating can be tuned to have a transmission characteristic similar to curve 80.

Figure 5:
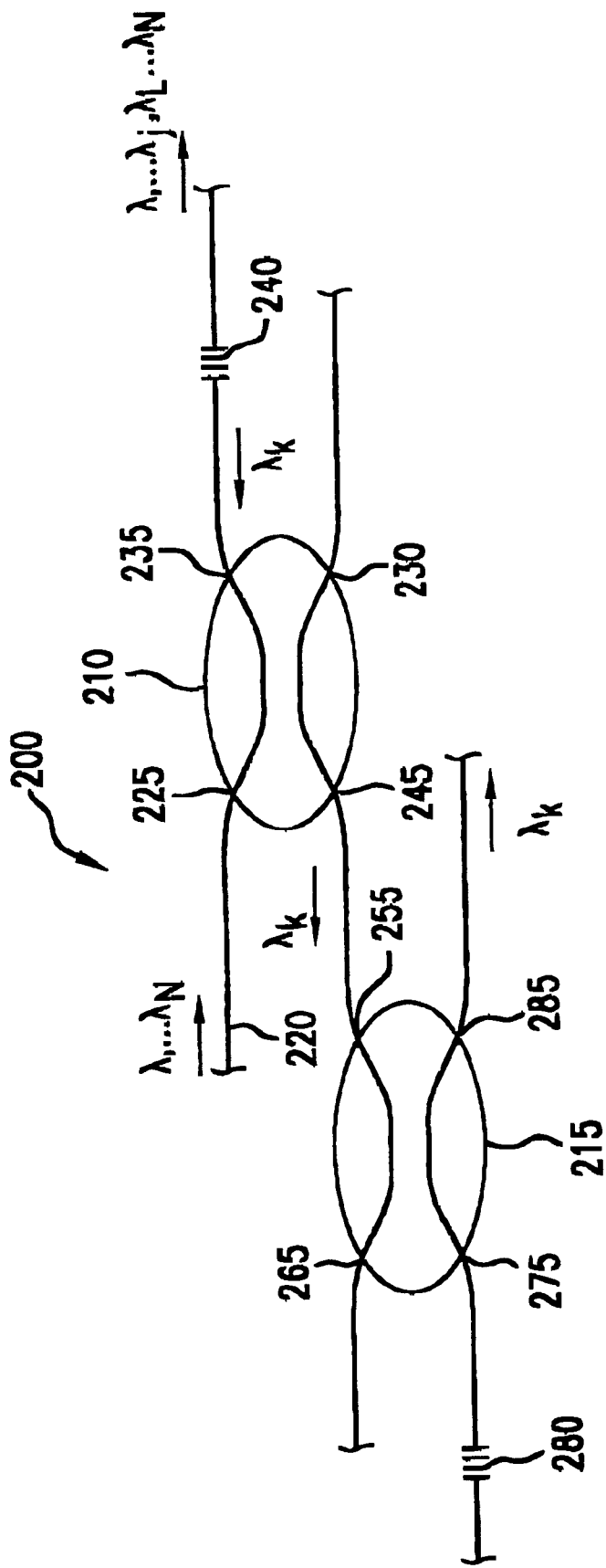
FIG. 5 is a schematic view of an alternative embodiment of an optical device in accordance with the present invention.

FIG. 5 schematically illustrates an alternative embodiment of the present invention. An optical device 200 includes a first optical coupler 210 and a second optical coupler 215. The optical couplers can be, for example, fused fiber couplers. First coupler 210 optically communicates with transmission path 220 and is configured to receive, via port 225, multiplexed optical signals having a plurality of optical channels, each at a respective wavelength $\lambda_1 \ldots \lambda_N$. A first portion of the signals entering coupler 210 exit to low reflectivity port 230. A second portion of the signals exit coupler 210 via input/output port 235 and arc supplied to in fiber Bragg grating 240. The Bragg grating can be a narrow grating having, for example, a transmission characteristic as described with reference to FIGS. 3 and 4. Thus, optical signals having a particular wavelength, e.g. $\lambda_K$, are reflected by grating 240 back toward input/output port 235 of coupler 210. The remaining channels having wavelengths, e.g., $\lambda_1 \ldots \lambda_J, \lambda_L \ldots \lambda_N$, are transmitted by grating 240. The reflected signals exits coupler 210 via port 245 and are supplied to port 255 of second coupler 215. A portion of the reflected signals exit coupler 215 to low reflectivity port 265. Another portion of the reflected signals exit coupler via input/output port 275 and are supplied to in fiber Bragg grating 280. Bragg grating 280 can be narrow grating having, for example, a transmission characteristic as described with reference to FIGS. 3 and 4. Optical signals having a particular wavelength, e.g. $\lambda_K$, are reflected by grating 280 toward input/output port 275 and exit coupler 215 via port 285. In this manner, gratings 240 and 280 are employed to select a narrowly spaced optical channel from multiplexed optical signals.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device configured to select an optical channel from a plurality of closely spaced optical channels comprising:

an optical transfer element having a first port for receiving multiplexed optical signals having a plurality of channels, each of said channels at a respective wavelength, said optical transfer element having a second, third and fourth ports;

a first filtering element optically communicating with said second port of said transfer element, said first filtering element being a narrow band filtering element and being configured to have a reflectivity characteristic at or near a particular wavelength associated with one channel included in said plurality of multiplexed channels, said first filtering element receiving said multiplexed signal and reflecting a first portion of said multiplexed signal including said one optical channel toward said second port of said optical transfer element, said first filtering element being the only filtering element optically communicating with said second port; and a second filtering element optically communicating with said third port of said optical transfer element, said second filtering element being a narrow band filtering element and being configured to have a reflectivity characteristic at or near said said particular wavelength, said second filtering element receiving said first portion of said multiplexed signal and reflecting said one optical channel toward said third port of said transfer element and transmitting a second portion of said multiplexed signal including channels near said one channel, said optical transfer element supplying said one channel at said particular wavelength to said fourth port.

2. The optical device in accordance with claim 1 wherein said optical transfer element comprises an optical circulator.

3. The optical device in accordance with claim 1 wherein said first filtering element comprises a Bragg grating.

4. The optical device in accordance with claim 1 wherein said second filtering element comprises a Bragg grating.

5. The optical device in accordance with claim 3 wherein said Bragg grating has a length of approximately 3 to 3.5 cm.

6. The optical device in accordance with claim 4 wherein said Bragg grating has a length of approximately 3 to 3.5 cm.

7. The optical device in accordance with claim 1 wherein a transmissivity characteristic associated with said first and second filtering elements is substantially similar.

8. The optical device in accordance with claim 1 wherein said first filtering element is further configured to transmit a third portion of said multiplexed signal, said third portion including one or more wavelengths outside of said particular wavelength.

9. The optical device in accordance with claim 3 wherein said first grating has a low reflectively characteristic associated with wavelengths less than said particular wavelength.

10. The optical device in accordance with claim 3 wherein said first grating has a low reflectively characteristic associated with wavelengths greater than said particular wavelength.

11. The optical device in accordance with claim 3 wherein said second grating has a low reflectively characteristic associated with wavelengths less than said particular wavelength.

12. The optical device in accordance with claim 3 wherein said second grating has a low reflectively characteristic associated with wavelengths greater than said particular wavelength.

13. An optical device comprising:

a first optical transfer element having a first, second and third ports, said first port configured to receive a multiplexed optical signal having a plurality of channels, each of said channels at a respective wavelength;

a second optical transfer element having a first, second and third ports, said first port of said second transfer element optically communicating with said third port of said first optical transfer element;

a first grating optically communicating with said second port of said first optical transfer element, said first grating being a narrow band Bragg grating and being the only grating optically communicating with said second port of said first optical transfer element, said first grating being configured to have a low transmission characteristic at or near at least one particular wavelength included in said plurality of channels, said first grating receiving said multiplexed signal and reflecting a first portion of said multiplexed signal including said at least one channel toward said second port of said first optical transfer element, said first portion of said multiplexed signal exiting said first transfer element via said third port; and a second grating optically communicating with said second port of said second transfer element, said second grating being a narrow band Bragg grating and being the only grating optically communicating with said second port of said second optical transfer element, said second grating being configured to have a low transmission characteristic at or near said at least one particular wavelength, said second grating receiving said first portion of said multiplexed signal and reflecting said at least one channel toward said second port of said second optical transfer element and transmitting a third portion of said multiplexed signal including channels outside of said at least one channel, said at least one channel exiting said second optical transfer element via said third port of said second optical transfer element.

14. The optical device in accordance with claim 13 wherein said first optical transfer clement comprises an optical circulator.

15. The optical device in accordance with claim 13 wherein said second optical transfer element comprises an optical circulator.

16. The optical device in accordance with claim 13 wherein said first Bragg grating has a length of approximately 3 to 3.5 cm.

17. The optical device in accordance with claim 13 wherein said second Bragg grating has a length of approximately 3 to 3.5 cm.

18. The optical device in accordance with claim 13 wherein said first grating has a high transmission characteristic associated with wavelengths less than said particular wavelength.

19. The optical device in accordance with claim 13 wherein said first grating has a high transmission characteristic associated with wavelengths greater than said particular wavelength.

20. The optical device in accordance with claim 13 wherein said second grating has a high transmission characteristic associated with wavelengths less than said particular wavelength.

21. The optical device in accordance with claim 13 wherein said second grating has a high transmission characteristic associated with wavelengths greater than said particular wavelength.

22. An optical device comprising:

a first fused fiber coupler having a first, second and third ports, said first port configured to receive a multiplexed optical signal having a plurality of channels, each of said channels at a respective wavelength;

a second fused fiber coupler having a first, second and third ports, said first port of said second fused fiber coupler optically communicating with said third port of said first fused fiber coupler;

a first Bragg grating optically communicating with said second port of said first fused fiber coupler, said first Bragg grating being configured to have a low transmission characteristic at or near at least one particular wavelength included in said plurality of channels, said first grating receiving said multiplexed signal and reflecting a first portion of said multiplexed signal including said at least one channel toward said second port of said first fused fiber coupler, said first portion of said multiplexed signal exiting said first fused fiber coupler via said third port; and a second Bragg grating optically communicating with said second port of said second transfer element, said second Bragg grating being configured to have a low transmission characteristic at or near said at least one particular wavelength, said second Bragg grating receiving said first portion of said multiplexed signal and reflecting said at least one channel toward said second port of said second fused fiber coupler and transmitting a third portion of said multiplexed signal including channels outside of said at least one channel, said at least one channel exiting said second fused fiber coupler via said third port of said second fused fiber coupler.

* * * * *